US005552088A

United States Patent [19]

Pottier et al.

[11] Patent Number: 5,552,088

[45] Date of Patent: Sep. 3, 1996

[54] NON-OZONE DEPLETING MALODOROUS COMPOSITION OF MATTER AND WARNING SYSTEM

[76] Inventors: Charles Pottier, 6700 Johnston Rd.; Richard Varien, 20 Foothill Ct., both of Danville, Calif. 94588

[21] Appl. No.: 324,804

[22] Filed: Oct. 18, 1994

[51] Int. Cl.[6] .................... G01D 21/00

[52] U.S. Cl. .................... 116/214; 252/365; 252/408.1; 424/45; 454/168; 514/438; 514/706

[58] Field of Search .................... 252/408.1; 422/305; 73/23.34; 48/195; 116/214

[56] References Cited

U.S. PATENT DOCUMENTS 3,861,350 1/1975 Selleck .................... 116/214

5,102,557 4/1992 Nimitz et al. .................... 252/8

*Primary Examiner*—Gary Geist
*Assistant Examiner*—Valerie Fee
*Attorney, Agent, or Firm*—John J. Hall

[57] ABSTRACT

A non-ozone depleting malodorous composition of matter that contains a liquid mercaptan mixed with a nonflammable and non-ozone depleting solvent, 1,1,1,2-tetrafluoroethane, and with an inert gas such as nitrogen under pressure in a container for introduction into a pressurized breathing system, such as in mines, thereby forming a warning system to warn a person of danger when the malodorous composition of matter is released from the container.

13 Claims, 1 Drawing Sheet

NON-OZONE DEPLETING MALODOROUS COMPOSITION OF MATTER AND WARNING SYSTEM

BACKGROUND OF THE INVENTION

1. Field of the Invention

This invention relates to improvements in malodorous compositions of matter in conjunction with pressurized air systems to warn persons, such as miners in mines, of danger by smelling the released odor.

2. Prior Art

The malodorous compositions of matter disclosed in U.S. Pat. No. 3,861,350 used nonflammable solvents which caused ozone depletion of the earth's atmosphere. These solvents all contained chlorine, and included trichloromono- fluoromethane, trichlorotrifluoroethane, 1,1,1 trichloroethane, methylene chloride, trichloroethylene, and perchloroethylene. Applicants are unaware of any prior art using 1,1,1,2-tetrafluoroethane as a nonflammable solvent for a malodorous composition of matter for use in a warning system, and which is also non-ozone depleting.

SUMMARY OF THE INVENTION

This invention comprises an improved warning system having a malodorous composition of matter that uses a nonflammable and non-ozone depleting solvent in conjunction with a suitable mercaptan and an inert gas under pressure. This solvent is 1,1,1,2-tetrafluoroethane.

When this solvent is mixed with a suitable mercaptan and a suitable inert gas under pressure is added, the resulting composition of matter produces a nonflammable blend which eliminates the ozone depletion problem caused by previous formulations as disclosed in U.S. Pat. No. 3,861,350.

Suitable mercaptans are preferably liquid at ambient temperatures and include methyl mercaptan, ethyl mercaptan, n-propyl and isopropyl mercaptan, butyl mercaptan, both secondary and tertiary, and tetrahydrothiophene.

Other suitable malodorous compounds which may be used to make up a workable malodorous composition of matter are dimethyl sulfide and ethyl iso-propyl sulfide.

Since these malodorous compounds are either flammable or explosive or both, a nonflammable solvent such as 1,1,1,2-tetrafluoroethane is required and is essential because of its non-ozone depleting nature. Further, this solvent has a suitable vapor pressure which is not over 100 pounds per square inch at sea level and at a maximum temperature of 25 degrees Centigrade.

The most suitable inert gas for use in the malodorous composition of matter is nitrogen gas. The container for the malodorous composition of matter is charged to an internal pressure of about 275 pounds per square inch at room temperature with nitrogen gas so that sufficient pressure exists to expel the malodorous composition of matter into pressurized air breathing systems commonly maintained in mines in the United States at about 150 pounds per square inch.

Containers used for the malodorous composition of matter must be high pressure cylinders with a capability of withstanding up to 375 pounds per square inch of pressure at sea level. Such containers may be equipped with either a high pressure needle valve which has a corrosion resistant seat, or with a ball valve having corrosion resistant capability.

The warning system is created when the container, after being filled with the malodorous composition of matter under pressure of nitrogen gas, is then equipped with an adapter and feeder tube means for connection to a valve of a pressurized air breathing system and is then connected.

An object of this invention is to provide a malodorous composition of matter which is nonflammable and non-ozone depleting, and non-explosive.

Another object of this invention is to provide a malodorous composition of matter which can be pressured in a container with an inert gas for delivery to a pressurized air breathing system, thereby forming a warning system.

A further object of this invention is to provide a malodorous composition of matter which is relatively easy to formulate.

These and other objects will be more readily understood by reference to the following specification and claims, taken in conjunction with the accompanying drawing.

FIG. 1 of the drawing is a side elevational view of the invention with the cylinder containing the malodorous composition of matter under nitrogen gas pressure connected to a pressurized air breathing system which is shown in dotted lines. The cylinder is equipped with a needle valve.

FIG. 2 is identical to FIG. 1 except that the cylinder is equipped with a ball valve.

DESCRIPTION OF PREFERRED EMBODIMENTS

EXAMPLE 1

Figure 1:
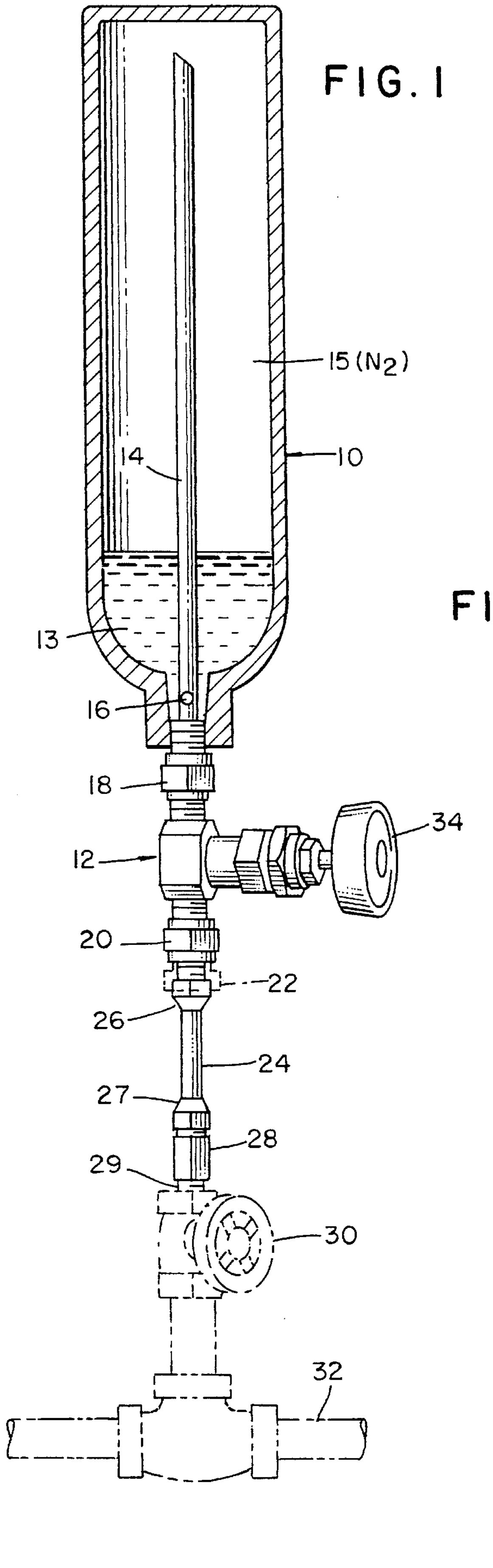
Figure 2:
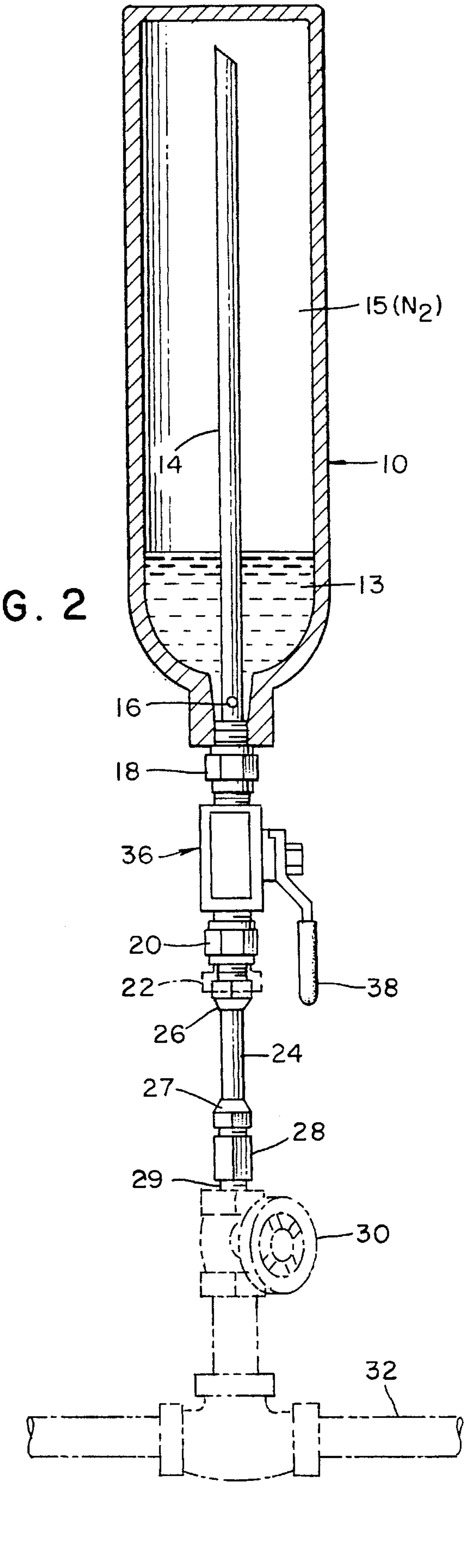

A suitable malodorous composition of matter which is nonflammable and non-ozone depleting may be prepared at room temperatures with ethyl mercaptan as the malodorous ingredient and with 1,1,1,2-tetrafluoroethane as the solvent.

About 100 to 500 grams of ethyl mercaptan is placed inside a high pressure cylinder 10, capable of withstanding internal pressures of from 240 to 500 pounds per square inch at sea level, and equipped with a high pressure needle valve 12. The cylinder 10 may have an internal capacity of from 75 to 189 cubic inches.

Then, from 450 to 2500 grams of 1,1,1,2-tetrafluoroethane is added to the ethyl mercaptan in the cylinder 10 as the nonflammable and non-ozone depleting solvent to form the malodorous composition of matter 13.

Thereafter, nitrogen gas 15 under pressure is introduced into the cylinder 10 through needle valve 12 in an amount sufficient to produce an internal pressure of from 240 to 500 pounds per square inch, depending upon the particular capacity of the cylinder 10.

Preferably, the cylinder 10 with its contents is then agitated for a suitable period of time, at least 30 seconds, to thoroughly mix its contents and complete any absorption of the nitrogen gas by the combination of the ethyl mercaptan and the solvent. Any such absorption will not cause any appreciable lowering of the internal pressure in the cylinder 10. The resulting internal pressure in the cylinder 10 will still be more than ample to permit easy introduction of the malodorous composition of matter into a conventional air breathing systems having a pressure of 150 pounds per square inch.

Cylinder 10 is preferably equipped internally with a tapered vapor tap dip tube 14 having an opening 16 in its side wall at its upper end and with its lower end extending almost to the inside bottom of cylinder 10. The dip tube 14 facilitates the filling of cylinder 10 with the malodorous composition of matter as well as the release of the malodorous composition of matter into a pressurized air breathing system. The dip tube 14 and its opening 16 facilitates the mixing of the components of the malodorous composition of matter into a homogeneous blend. The dip tube 14 is swaged into adapter 18 whose lower end is threaded in the neck portion of cylinder 10 and closes its inner end. The adapter's upper end is threaded into needle valve 12 whose outer end receives a threaded male hexagonal connector 20. A hexagonal cap nut 22 closes the outer end of connector 20. The filled and capped cylinder 10 may then be stored at ambient temperatures until it is placed in operation.

In use, the cylinder 10 is positioned upright with the needle valve 12 at the bottom. The cap nut 22 is removed and one end of a feeder tube 24 having a flared threaded fitting 26 is connected to the connector 20. The other end of the feeder tube 24 having a flared threaded fitting 27 is connected to an adapter 28 to pipe nipple 29 of valve 30 of the pressurized air breathing system 32 which is to receive warning. Needle valve 12 is equipped with a handle 34 to open and close it. Upon opening the needle valve 12, all of the liquid contents of the cylinder 10 will be exhausted into the pressurized air breathing system 32 in about 5 seconds due to the greater pressure in cylinder 10 in comparison with the air breathing system. A substantial part of the inert nitrogen gas 15 will also be exhausted into the pressurized air breathing system 32 until equilibrium of pressure is reached with the air breathing system 32. Valve 30 of the pressurized air breathing system 32 is then closed and if it is desired to remove the cylinder 10 from its connection to the air breathing system 32, the needle valve 12 is closed and cylinder 10 is separated from air breathing system 32.

For air breathing systems having a pressure of about 150 pounds per square inch, the above procedure producing a warning system can be performed at ambient temperatures ranging from about 10 degrees F. to about 130 degrees F. without any heating or cooling of cylinder 10 or any special preparation.

EXAMPLE 2

The steps of Example 1 are repeated except for using a cylinder 10 equipped with a ball valve 36 having a handle 38 to open and close ball valve 36, instead of a needle valve 12.

The same results are obtained as in Example 1.

Whether a cylinder equipped with a ball valve or needle valve is to be used, depends on the particular application. The ball valve may provide slightly more accurate release of the malodorous composition of matter, whereas the needle valve has a slightly better shutoff with less wear and leaking.

The ratio of parts by weight of the liquid malodorous substance and the solvent may vary from 1 part of the former to 2 parts of the latter as a maximum, to about 1 part of the former to about 6 parts of the latter without adversely affecting the results. The amount of inert gas may vary from 0.2 to 0.4 parts by weight where the ratio of liquid malodorous substance and solvent is 1:2 and 1:6 respectively, thereby producing a variance in internal pressure of a 75 cubic inch high pressure cylinder from about 200 pounds per square inch to about 430 pounds per square inch at room temperatures of about 70 degrees F. without adversely affecting the results. Suitable high pressure cylinders which are capable of withstanding such higher pressures must be used.

To use high pressure cylinders of capacities other than 75 cubic inches internally, the various amounts of ingredients may be adjusted in proportion to the increased or diminished capacity of the cylinder so that effective operating pressures may be obtained internally over the temperature range of 10 degrees to 130 degrees F. Higher internal pressures, over 275 pounds per square inch, may be effectively used where the expected operating temperatures are below 30 degrees F.

However, the proper operation of the invention requires that the internal pressure of the charged cylinder always must be greater than that of the pressurized air breathing system that will use the invention.

Although I have described preferred embodiments of the invention, it is understood that the scope of the invention is not to be limited thereby, but numerous variations in ingredients and procedures are possible without departing from the spirit and scope of the invention as claimed herein.

I claim:

1. A malodorous warning composition of matter which is nonflammable and non-ozone depleting for introduction into a pressurized air breathing system of a facility to warn a person of danger, comprising:

about 1 part by weight of a liquid malodorous substance selected from the group consisting of methyl mercaptan, ethyl mercaptan, propyl mercaptan, butyl mercaptan, and tetrahydrothiophene;

from about 2 to about 6 parts by weight of 1,1,1,2-tetrafluoroethane; and from about 0.2 to about 0.4 parts by weight of an inert gas under pressure.

2. A malodorous warning composition of matter according to claim 1 in which the inert gas is nitrogen.

3. A malodorous warning composition of matter which is nonflammable and non-ozone depleting for introduction into a pressurized air breathing system of a facility to warn a person of danger, comprising:

about 1 part by weight of dimethyl sulfide;

from about 2 to about 6 parts by weight of 1,1,1,2-tetrafluoroethane; and from about 0.2 to about 0.4 parts by weight of an inert gas under pressure.

4. A malodorous warning composition of matter according to claim 3 in which the inert gas is nitrogen.

5. A malodorous warning composition of matter which is nonflammable and non-ozone depleting for introduction into a pressurized air breathing system of a facility to warn a person of danger, comprising:

about 1 part by weight of ethyl iso-propyl sulfide;

from about 2 to about 6 parts by weight of 1,1,1,2-tetrafluoroethane; and from about 0.2 to about 0.4 parts by weight of an inert gas under pressure.

6. A malodorous warning composition of matter according to claim 5 in which the inert gas is nitrogen.

7. A warning system for introducing a malodorous warning composition of matter which is nonflammable and non-ozone depleting into a air breathing system of a facility having an air pressure of about 150 pounds per square inch, to warn a person therein of danger, comprising:

a high pressure container equipped with valve means at one end;

about 1 part by weight of a liquid malodorous substance in side said container;

from about 2 to about 6 parts by weight of a nonflammable and non-ozone depleting solvent for said liquid malodorous substance, said solvent having a maximum vapor pressure of less than 100 pounds per square inch at sea level and a temperature of about 25 degrees C. inside said container;

from about 0.2 to about 0.4 parts by weight of an inert gas under pressure inside said container, whereby a pressure of at least 240 pounds per square inch is produced inside said high pressure container, and connecting means connecting said valve means of said container to valve means of a pressurized air breathing system of a facility.

8. A warning system according to claim 7 in which the liquid malodorous substance is selected from the group consisting of methyl mercaptan, ethyl mercaptan, propyl mercaptan, butyl mercaptan, and tetrahydrothiophene.

9. A warning system according to claim 7 in which the nonflammable and non-ozone depleting solvent is 1,1,1,2-tetrafluoroethane.

10. A warning system according to claim 7 in which the liquid malodorous substance is a mercaptan which is a liquid at room temperature.

11. A warning system according to claim 7 in which the liquid malodorous substance is dimethyl sulfide.

12. A warning system according to claim 7 in which the liquid malodorous substance is ethyl iso-propyl sulfide.

13. A warning system according to claim 7 in which the inert gas is nitrogen.

* * * * *